US009718442B2

(12) United States Patent
Boland

(10) Patent No.: US 9,718,442 B2
(45) Date of Patent: Aug. 1, 2017

(54) WINDSCREEN WIPER DEVICE

(75) Inventor: Xavier Boland, Arlon (BE)

(73) Assignee: Federal-Mogul S.A., Aubange (BE)

(*) Notice: Subject to any disclaimer, the term of this patent is extended or adjusted under 35 U.S.C. 154(b) by 164 days.

(21) Appl. No.: 14/110,218

(22) PCT Filed: Apr. 7, 2011

(86) PCT No.: PCT/EP2011/055413
§ 371 (c)(1),
(2), (4) Date: Oct. 7, 2013

(87) PCT Pub. No.: WO2012/136257
PCT Pub. Date: Oct. 11, 2012

(65) Prior Publication Data
US 2014/0026350 A1 Jan. 30, 2014

(51) Int. Cl.
B60S 1/38 (2006.01)
B60S 1/40 (2006.01)

(52) U.S. Cl.
CPC .......... *B60S 1/3849* (2013.01); *B60S 1/3856* (2013.01); *B60S 1/3808* (2013.01); *B60S 1/3855* (2013.01); *B60S 1/3868* (2013.01); *B60S 1/3877* (2013.01); *B60S 2001/4054* (2013.01); *Y10T 29/49954* (2015.01)

(58) Field of Classification Search
CPC .... B60S 1/3858; B60S 1/3856; B60S 1/3877; B60S 1/40; B60S 1/3853; B60S 1/3851; B60S 1/3849
USPC ........................................ 15/250.32, 250.452
See application file for complete search history.

(56) References Cited

U.S. PATENT DOCUMENTS

| 5,231,730 A * | 8/1993 | Schmid et al. .......... 15/250.452 |
| 5,661,871 A * | 9/1997 | Scorsiroli ............. B60S 1/3801 |
| | | 15/250.451 |
| 5,802,663 A * | 9/1998 | Criel ........................ 15/250.452 |

(Continued)

FOREIGN PATENT DOCUMENTS

| DE | 19835065 A1 | 2/2000 |
| DE | 102009002411 A1 | 10/2010 |
| EP | 2236366 A1 | 10/2010 |

OTHER PUBLICATIONS

International Search Report, dated Nov. 25, 2011.

*Primary Examiner* — Andrew A Horton
(74) *Attorney, Agent, or Firm* — Robert L. Stearns; Dickinson Wright, PLLC

(57) ABSTRACT

A windscreen wiper device, particularly for automobiles, comprising an elastic, elongated carrier element, as well as an elongated wiper blade (7) of a flexible material, which can be placed in abutment with a windscreen to be wiped, which wiper blade (7) is of the flat blade type and includes at least one groove (19), in which groove (19) a longitudinal strip (20) of the carrier element is disposed, and wherein said windscreen wiper device comprises a connecting device (1) for detachably connecting said wiper blade (7) to an oscillating arm near one end thereof around a pivot axis, wherein said connecting device (1) is fixated to said flexible material of said wiper blade (7) by deformation of said connecting device (1) in order to block any lateral movement between said longitudinal strip (20) and said wiper blade (7) at the location of their interconnection and between said connecting device (1) and said wiper blade (7) at the location of their interconnection.

10 Claims, 3 Drawing Sheets

(56) References Cited

U.S. PATENT DOCUMENTS

| | | | |
|---|---|---|---|
| 6,766,553 B2 * | 7/2004 | Wilson | B60S 1/38 15/250.04 |
| 2006/0265830 A1 | 11/2006 | Walworth et al. | |
| 2007/0113366 A1 | 5/2007 | Walworth et al. | |
| 2009/0044365 A1 * | 2/2009 | Koppen et al. | 15/250.31 |
| 2009/0113653 A1 * | 5/2009 | Thienard | 15/250.32 |
| 2010/0024149 A1 * | 2/2010 | Erdal | 15/250.32 |

* cited by examiner

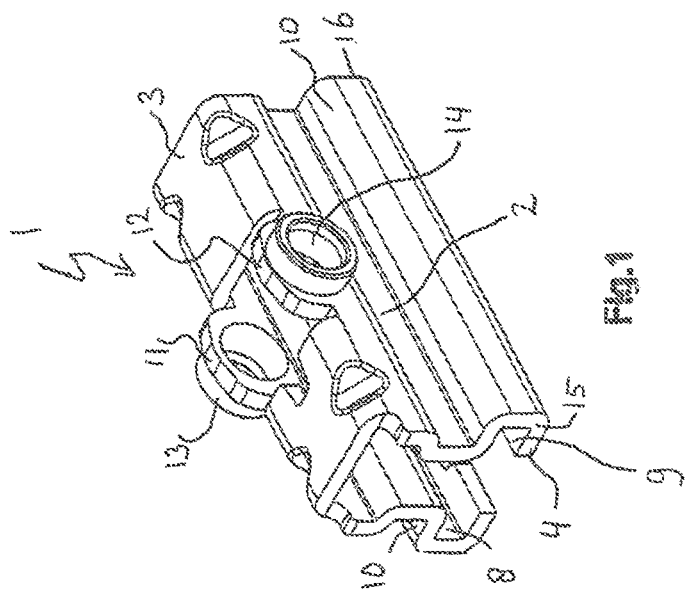
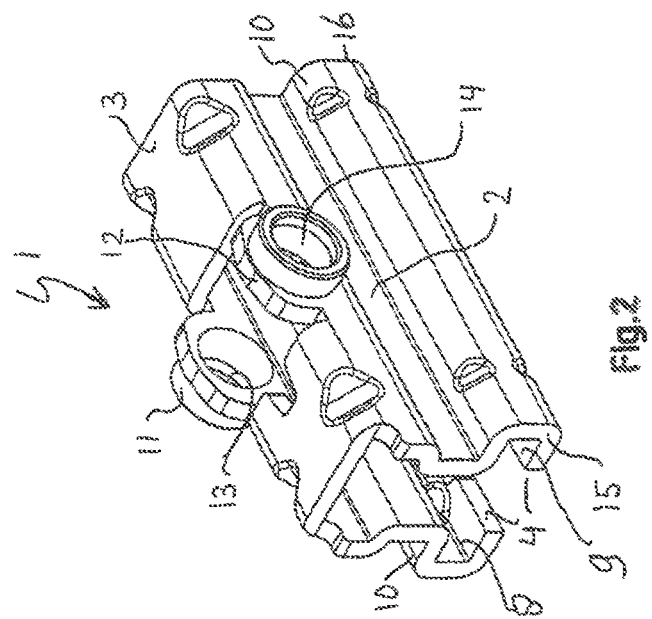
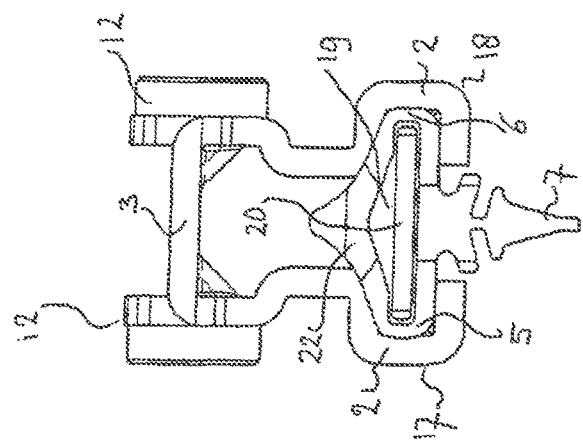

WINDSCREEN WIPER DEVICE

BACKGROUND OF THE INVENTION

1. Technical Field

The present invention relates to a windscreen wiper device, particularly for automobiles, comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of the carrier element is disposed, and wherein the windscreen wiper device comprises a connecting device for detachably connecting the wiper blade to an oscillating arm near one end thereof around a pivot axis. Usually, a mounting head is provided for transferring a reciprocal movement to the oscillating arm. the wiper blade particularly comprises a spoiler at a side thereof facing away from a windscreen to be wiped. The invention particularly relates to a connecting device made in one piece, also called a "one piece connector base". More in particular, the oscillating arm may be connected to the base with the interposition of a joint part, in practice also called a "spacer".

2. Related Art

Such a windscreen wiper device and such a wiper blade are generally known. This prior art wiper blade is designed as a so-called "flat blade" or "yokeless blade", wherein no use is made of several yokes pivotally connected to each other, but wherein the wiper blade is biased by the carrier element, as a result of which it exhibits a specific curvature. In practice the wiper blade often comprises a spoiler at a side thereof facing away from the windscreen to be wiped. The spoiler is also called an "air deflector".

SUMMARY OF THE INVENTION

The object of the invention is to provide an improved windscreen wiper device.

In order to accomplish that objective, a windscreen wiper device of the type referred to in the introduction is characterized according to the invention in that the connecting device is fixated to the flexible material of the wiper blade by deformation of the connecting device in order to block any lateral movement between the longitudinal strip and the wiper blade at the location of their interconnection and between the connecting device and the wiper blade at the location of their interconnection. In use, during each oscillatory movement of the oscillatory arm, the wiper blade at the location outside the connection device would normally suffer from the so-called "fishtailing phenomenon", wherein the wiper blade on opposite sides of the connecting device vibrates in an uncontrollable manner parallel to a windscreen to be wiped. Obviously, this "fishtailing phenomenon" results in deteriorated wiping properties, with all negative consequences involved, particularly at high speeds.

According to the invention the connecting device is clamped onto the flexible material of the wiper blade, wherein a controlled and predetermined pressure is applied by the connecting device onto the wiper blade. Experimental results have shown that the "fishtailing phenomenon" is avoided at least to a large extend, so that the wiping properties are improved.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade. Further, the present invention is not restricted to automobiles, but also refers to other fast vehicles, such as trains and the like.

Preferably, the connecting device is fixated to the flexible material of the wiper blade by plastic deformation of the connecting device. Instead or in addition thereto, deformation of the flexible material of the wiper blade upon introduction of the longitudinal strip inside the groove when the connecting device is already mounted thereon, ensures the fixation.

In a preferred embodiment of a windscreen wiper device in accordance with the invention the connecting device has an at least substantially U-shaped cross-section having legs and a base, wherein the legs have inwardly bent edges at their outer ends, wherein opposite sides of the wiper blade rest in respective slits formed by the inwardly bent edges and outwardly bent parts of the legs. Hence, a controlled and predetermined pressure can be applied by the legs of connecting device onto the wiper blade sandwiched between them.

In another preferred embodiment of a windscreen wiper device according to the invention the connecting device is deformed at the location of the inwardly bent edges and outwardly bent parts of the legs. the deformation is advantageously achieved through a pinching operation being a well-controllable and reliable operation. In the alternative or in addition thereto a melting operation is carried out at these locations, which melting operation is particularly carried out by ultrasonic heating. Locally melting the connecting device has the result that locally inwardly extending protrusions are formed, wherein opposite protrusions exert a clamping force so that the connecting device is clamped onto the flexible material of the wiper blade, as if it were a pinching operation. the pinching operation is advantageously applied in case the connecting device is made of metal (preferably steel), whereas the melting operation is particularly applied when the connecting device is made of a plastic material.

In another preferred embodiment of a windscreen wiper device in accordance with the invention the connecting device is deformed near outer ends of the connecting device.

Particularly, the connecting device is deformed at near the outer ends of the connecting device on opposite sides of the connecting device.

In another preferred embodiment of a windscreen wiper device according to the invention the legs are provided near the base with a pair of opposite protrusions having co-axial through holes. the through holes are particularly arranged to receive connection means, for example in the form of a pivot pin, on the oscillating arm. For example, the oscillating arm may be provided with an extension comprising a pivot pin being able to pivot around the pivot axis, as well as a L-shaped shoulder acting as securing means for securing the connecting device on the pivot pin, wherein the L-shaped shoulder projects out in the direction of the pivot pin and across the wiper blade and at the free end of which is disposed a leg facing the windscreen to be wiped, and wherein the connecting device comprises a transverse through hole for receiving the pivot pin. Accordingly, the wiper blade may then be connected to the oscillating arm on the basis of a so-called "sidelock system". The oscillating arm is provided with the pivot pin or joint pin to be inserted in the co-axial through holes. the pivot pin protrudes in a direction towards the wiper blade and has a pivot axis extending in a direction of the oscillating movement of the oscillating arm. Preferably, the protrusions have a round cross-section.

A windscreen wiper device according to the invention comprises a mounting head fixed for rotation to a shaft, wherein the shaft is rotatable alternately in a clockwise and in a counter-clockwise sense carrying the mounting head into rotation. the oscillating arm is connected to the mounting head fixed for rotation to the shaft driven by a small motor. In use, the shaft rotates alternately in a clockwise and in a counter-clockwise sense carrying the mounting head into rotation also, which in turn draws the oscillating arm into rotation and by means of the connecting device moves the wiper blade. Further, a windscreen wiper device in accordance with the invention comprises a connecting piece positioned on both ends of the wiper blade and connected to an end of the longitudinal strip.

The present invention also relates to a method for fixating a connecting device for detachably connecting an elongated wiper blade of the flat blade type and of a flexible material to an oscillating arm near end thereof around a pivot axis, to—the flexible material, wherein the wiper blade includes at least one groove, in which groove a longitudinal strip of the carrier element is disposed, characterized in that the connecting device is fixated to the flexible material of the wiper blade by deformation of the connecting device in order to block any lateral movement between the longitudinal strip and the wiper blade at the location of their interconnection and between the connecting device and the wiper blade at the location of their interconnection.

The method particularly comprises the following steps the connecting device having an at least substantially U-shaped cross-section with legs and a base, is mounted onto the wiper blade such that opposite sides of the wiper blade rest in respective slits formed by inwardly bent edges at outer ends of the legs and outwardly bent parts of the legs, the longitudinal strip is subsequently inserted inside the groove of the wiper blade, the connecting device is finally deformed at the location of the inwardly bent edges and outwardly bent parts of the legs and at the location of the base near outer ends of the connecting device on opposite sides of the connecting device.

In case the connecting device is made in one piece, before mounting the connecting device, the wiper blade is stressed outwardly in longitudinal direction thereof, wherein the wiper blade is subsequently released after the connecting device is mounted.

The invention will now be explained more in detail with reference to figures illustrated in a drawing, wherein:

FIGS. 1 and 2 are a perspective, schematic view of a preferred embodiment of a connecting device according to the invention, with and without deformation, respectively;

FIG. 3 is a schematic sideview of the connecting device of FIGS. 1 and 2, but now connected to a wiper blade;

DETAILED DESCRIPTION

Figure 5:
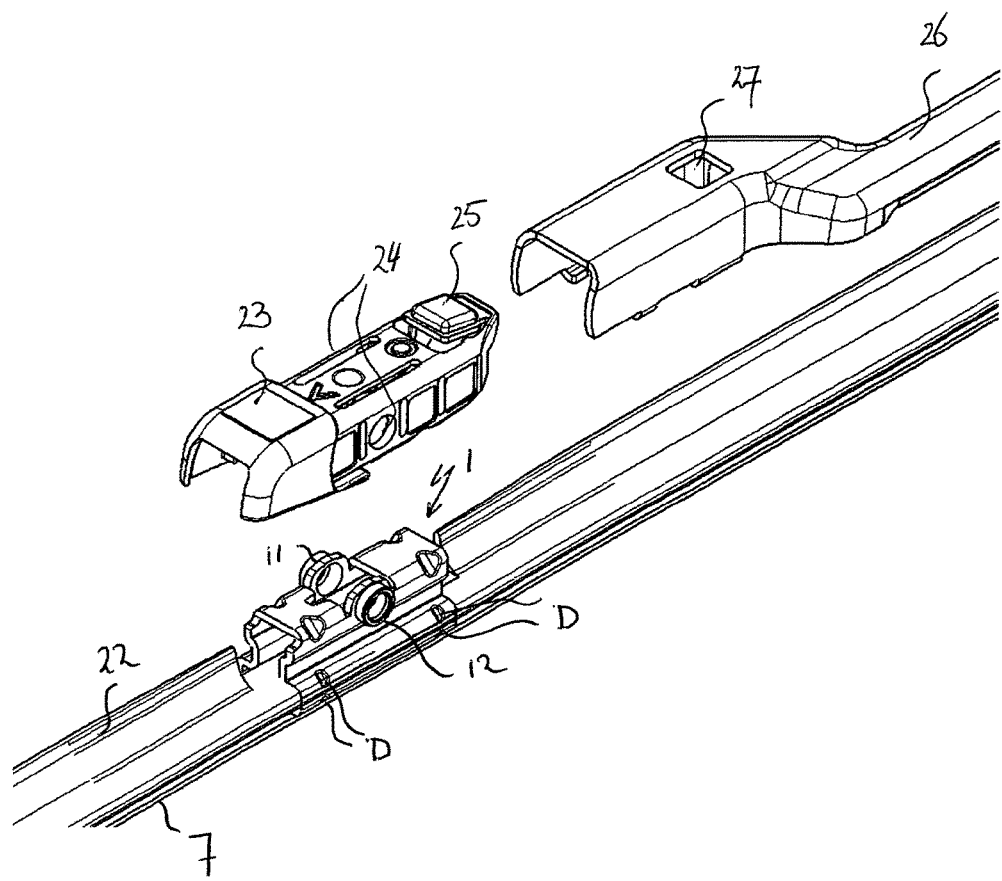
FIG. 5 is an exploded view of the connecting device, a joint part and an oscillating arm.

FIGS. 1 and 2 show a preferred variant of a connecting device (1), also called "connector base", according to the invention. As depicted, the connecting device (1) has an U-shaped cross-section having legs (2) and a base (3), wherein the legs (2) have inwardly bent edges (4) at their outer ends. Opposite sides (5,6) of a wiper blade (7) rest in respective slits or slots or grooves (8,9) formed by the inwardly bent edges (4) and outwardly bent parts (10) of the legs (2), wherein reference is made to FIGS. 2 and 3. The legs (2) are provided near the base (3) with a pair of opposite protrusions (11,12) having co-axial through holes (13,14). An oscillating arm is provided with a pivot pin or joint pin (not shown) to be inserted in the co-axial through holes (13,14). The pivot pin protrudes in a direction towards the wiper blade (7) and has a pivot axis extending in a direction of the oscillating movement of the oscillating arm. In the alternative as shown in FIG. 5, use is made of a joint part to be snapped or clicked on the protrusions (11,12), wherein an oscillating arm is connected to the joint part through a so-called "bayonet connection".

As shown in FIG. 2, the connecting device (1) is finally plastically deformed at the location of the inwardly bent parts (10) of the legs (2) near outer ends (15,16) of the connecting device (1) and on opposite sides (17,18) of the connecting device (1) (the wiper blade (7) being not shown in FIG. 2).

Figure 4:
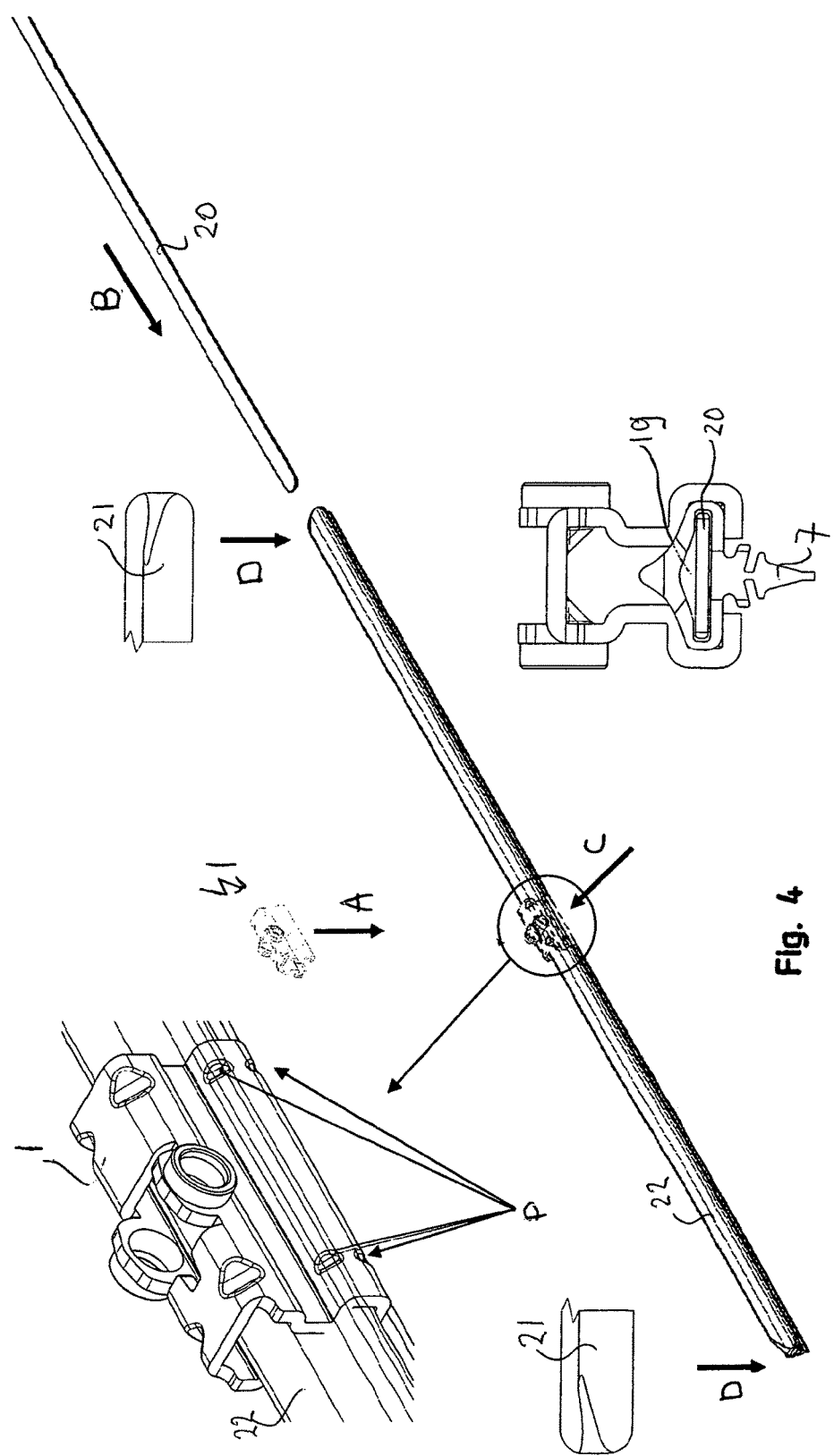
FIG. 4 is an exploded view and an assembled view of the wiper blade and the connecting device, as shown in FIGS. 1, 2 and 3 showing the stepwise mounting of the connecting device.

The windscreen wiper device according to the invention in FIG. 4 is built up of the elastomeric (rubber) wiper blade (7) of the flat blade type (shown in FIG. 3) comprising a central longitudinal groove (19), wherein a longitudinal strip (20) made of spring band steel is fitted in the longitudinal groove (19). the strip (20) forms a flexible carrier element for the rubber wiper blade (7), as it were, which is thus biased in a curved position (the curvature in operative position being that of a windscreen to be wiped). As shown, both ends or extremities (21) of the wiper blade (7) are not equipped with so-called "end caps", but the extremities are cut under an oblique angle with the longitudinal plane of the wiper blade 2 (parallel to the windscreen to be wiped) the rounded shape of the extremities (21) ensures that no noise is generated which is normally due to contact between an A-pillar of a vehicle and an end cap. The windscreen wiper device is furthermore built up of the connecting device (1) of FIGS. 1 through 3 made of metal for connecting an oscillating wiper arm thereto (not shown). The oscillating wiper arm is pivotally connected to the connecting device (1) about a pivot axis near one end. The preferred embodiment of FIGS. 3 and 4 according to the invention comprises a spoiler or "air deflector" (22) which is made in one piece with the rubber wiper blade (7) and which extends along the entire length thereof.

Although not shown in FIG. 1, but fully understood by a skilled person, the oscillating arm is connected to a mounting head fixed for rotation to a shaft driven by a small motor. In use, the shaft rotates alternately in a clockwise and in a counter-clockwise sense carrying the mounting head into rotation also, which in turn draws the oscillating arm into rotation and by means of the connecting device (1) moves the wiper blade (7).

As shown in FIG. 4, first the connecting device (1) having the U-shaped cross-section seen in FIGS. 1 through 3 is mounted onto the wiper blade (7), such that the opposite sides (5,6) of the wiper blade (7) rest in the respective slits (8,9) formed by the inwardly bent edges (4) at outer ends of the legs (2) and the outwardly bent parts (10) of the legs (2). This step is designated with A in FIG. 4. the longitudinal strip (20) is subsequently inserted inside the groove (19) of the wiper blade (7). This further step is designated with B in FIG. 4. the connecting device (1) is subsequently deformed at the location of the inwardly bent edges and outwardly bent parts (10) of the legs (2) near the outer ends (15,16) of the connecting device (1) on opposite sides (17,18) of the connecting device (1). This is done by a pinching operation. The locations of pinching are designated with arrows P. In the alternative or in addition thereto, a melting operation is carried out at these locations in order to locally melt material of the connecting device (1) to create a clamping force as if it were a pinching operation. This next step is designated with C in FIG. 4. Finally, the free ends or extremities (21) of the wiper blade (7) are cut to arrive at a dedicated shape thereof. This final step is designated with D in FIG. 4. The wiper blade (7) is then ready for use, after snapping a joint part onto the connector base (1), wherein reference is made to FIG. 5.

When the connecting device (1) is fixated to the rubber material of the wiper blade (7) through deformation, the wiper blade (7) is sandwiched between the legs (2) in the sense that the legs (2) engage the wiper blade (7) on opposite sides (5,6) thereof. In assembled position, that is when the deformation has taken place, the legs (2) of the connecting device (1) exert a controllable, predetermined pressure on the rubber material of the wiper blade (7).

Thus, any lateral movement between the longitudinal strip (20) and the wiper blade (7) at the location of their interconnection and between the connecting device (1) and the wiper blade (7) at the location of their interconnection is blocked.

In use, during each oscillatory movement of the oscillatory arm, the wiper blade (7) at the location outside the connection device (1) would normally suffer from the so-called "fishtailing phenomenon", wherein the wiper blade (7) on opposite sides (17,18) of the connecting device (1) vibrates in an uncontrollable manner parallel to a windscreen to be wiped. Obviously, this "fishtailing phenomenon" results in deteriorated wiping properties, with all negative consequences involved, particularly at high speeds. Hence, the longitudinal strip (20) is allowed to exhibit a curvature at the location of the interconnection of the connecting device (1) and the wiper blade (7).

Experimental results have shown that the "fishtailing phenomenon" is now avoided according to the invention at least to a large extend.

With reference to FIG. 5 a joint part (23) is detachably connected to the connecting device (1) by engaging protrusions (11,12) of the connecting device (1), at the location of the pivot axis, in co-axial recesses (24) provided in the joint part (23). As shown, the protrusions (11,12) extend outwards on either side of the connecting device (1). The joint part (23) comprises a resilient tongue (25) extending outwardly, while the oscillating arm (26) has a U-shaped cross-section at the location of its connection to the joint part (23), so that the tongue (25) engages in an identically shaped hole (27) provided in a base of the U-shaped cross-section. The connecting device (1) with the wiper blade (7) is mounted onto the oscillating arm as follows. The joint part (23) being already clipped onto the connecting device (1) is pivoted relative to the connecting device (1), so that the joint part (23) can be easily slided on a free end of the oscillating arm (26). During this sliding movement the resilient tongue (25) is initially pushed in against a spring force and then allowed to spring back into the hole in the oscillating arm, thus snapping, that is clipping the resilient tongue (25) into the hole (27) of the oscillating arm (26). This is a so-called bayonet-connection. The oscillating arm (26) together with the joint part (23) may then be pivoted back in a position parallel to the wiper blade (7) in order to be ready for use. By subsequently pushing in again the resilient tongue (23) against the spring force (as if it were a push button), the connecting device (1) and the joint part (23) together with the wiper blade (7) may be released from the oscillating arm (26). Dismounting the connecting device (1) with the wiper blade (7) from the oscillating arm (26) is thus realized by sliding the connecting device (1) and the joint part (23) together with the wiper blade (7) in a direction away from the oscillating arm (26).

The invention is not restricted to the variants shown in the drawing, but it also extends to other preferred embodiments that fall within the scope of the appended claims.

For example, a skilled person would easily recognise that the rubber wiper blade (7) is not necessarily made in one piece, as shown in FIGS. 3, 4 and 5. Instead thereof the wiper blade (7) is made of two parts, whether or not co-extruded, namely an upper holding part and a lower wiping part containing a wiping lip, wherein the upper holding part holds the lower wiping part.

The invention claimed is:

1. A windscreen wiper device, comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of the carrier element is disposed, and wherein said windscreen wiper device comprises a connecting device for detachably connecting said wiper blade to an oscillating arm near one end thereof around a pivot axis, wherein said connecting device has legs and is fixated to said flexible material of said wiper blade by plastic deformation of a localized portion of at least one of said legs of said connecting device in order to block any lateral movement between said longitudinal strip and said wiper blade at the location of their interconnection and between said connecting device and said wiper blade at the location of their interconnection, wherein said connecting device has an at least substantially U-shaped cross-section having said legs and a base, wherein said legs have inwardly and outwardly bent edges at their outer ends, wherein opposite sides of said wiper blade rest in respective slits formed by said inwardly bent edges and outwardly bent parts of said legs, and wherein said localized portion of said plastic deformation comprises a plurality of inwardly pinched portions on said inwardly bent and outwardly bent edges.

2. A windscreen wiper device according to claim 1, wherein said connecting device is deformed at the location of said inwardly bent edges and outwardly bent parts of said legs.

3. A windscreen wiper device according to claim 2, wherein said connecting device is deformed by a pinching operation.

4. A windscreen wiper device according to claim 2, wherein said connecting device is deformed by a melting operation.

5. A windscreen wiper device according to claim 2, wherein said connecting device is deformed near outer ends of said connecting device.

6. A windscreen wiper device according to claim 5, wherein said connecting device is deformed at near said outer ends of said connecting device on opposite sides of said connecting device.

7. A windscreen wiper device according to claim 1, wherein said legs are provided near said base with a pair of opposite protrusions having co-axial through holes.

8. A windscreen wiper device, comprising:
a wiper blade of flexible material having a central groove;
a longitudinal strip of metal disposed in said central groove;

a connecting device disposed centrally on said wiper blade with the majority of said wiper blade projecting longitudinally beyond said connecting device to opposite ends in cantilevered fashion and being supported in operation by said longitudinal strip;

said connecting device including a main body portion for engaging a wiper arm and including a pair of wiper blade-engaging legs wrapping about laterally opposite side edges of said wiper blade, said legs each having a U-shaped cross section presenting laterally inwardly facing slots in which laterally opposite side edges of said longitudinal strip and said laterally opposite side edges of said wiper strip are disposed; wherein said legs include localized, plastically deformed regions that act to locally narrow the cross-sectional size of said slots to locally constrict said wiper blade and thereby locally pinch said wiper blade forceably against said longitudinal strip to block any longitudinal movement of said longitudinal strip relative to said wiper blade at the location of said deformed region; and wherein each leg includes a laterally outwardly projecting top leg portion and a laterally inwardly projecting bottom leg portion and wherein each of said top and bottom leg portions have localized plastically deformed regions that are spaced from one another.

9. The windscreen wiper device of claim 8, wherein said connecting device is made of metal and said localized plastically deformed regions comprise locally crimped portions of said connecting device.

10. The windscreen wiper device of claim 8, wherein said connecting device is made of plastic and said localized plastically deformed regions comprise compressed heat staked portions of said connecting device.

* * * * *